(12) United States Patent  
Thiel et al.

(10) Patent No.: US 8,094,858 B2
(45) Date of Patent: Jan. 10, 2012

(54) EYEWEAR RETENTION DEVICE (76) Inventors: Joseph Adam Thiel, Interlochen, MI (US); Ryan David Wells, Traverse City, MI (US)

( * ) Notice: Subject to any disclaimer, the term of this patent is extended or adjusted under 35 U.S.C. 154(b) by 317 days.

(21) Appl. No.: 12/509,377

(22) Filed: Jul. 24, 2009

(65) Prior Publication Data

US 2010/0272304 A1    Oct. 28, 2010

Related U.S. Application Data (60) Provisional application No. 61/172,965, filed on Apr. 27, 2009.

(51) Int. Cl.
*H04R 25/00* (2006.01)
(52) U.S. Cl. ......... 381/381; 381/327; 381/376; 381/378
(58) Field of Classification Search .................. 381/327, 381/330, 370, 374, 376, 378, 379, 381, 383
See application file for complete search history.

(56) References Cited

U.S. PATENT DOCUMENTS

| | | | |
|---|---|---|---|
| 5,034,995 A | 7/1991 | Ciccone | |
| 5,715,323 A | 2/1998 | Walker | |
| 6,233,345 B1 | 5/2001 | Urwyler | |
| 7,310,427 B2 | 12/2007 | Retchin et al. | |
| 2002/0163486 A1 | 11/2002 | Ronzani et al. | |
| 2004/0160572 A1 | 8/2004 | Jannard et al. | |
| 2005/0088613 A1 | 4/2005 | Jackson et al. | |
| 2006/0093178 A1 | 5/2006 | Chen | |
| 2007/0033717 A1 | 2/2007 | Anderson | |
| 2007/0113326 A1 | 5/2007 | Pennell et al. | |
| 2007/0248238 A1 | 10/2007 | Abreu | |
| 2007/0253588 A1 | 11/2007 | Sanpei | |
| 2008/0107289 A1 | 5/2008 | Retchin et al. | |
| 2008/0142561 A1 | 6/2008 | Wang | |
| 2008/0204653 A1 | 8/2008 | Fielding | |
| 2009/0097688 A1 | 4/2009 | Lewis | |

FOREIGN PATENT DOCUMENTS

WO    WO 96/07947    3/1996

*Primary Examiner* — Suhan Ni
(74) *Attorney, Agent, or Firm* — Traverse Legal, PLC (57) ABSTRACT What is provided is an eyewear retention device comprising two ends, wherein each end is adapted for removable connection to an earpiece of an eyewear device; an audio device located at or substantially near at least one of the ends, wherein the audio device is adapted to play one or more audio signals for transmission to one or more surfaces of a human auditory passage at a location proximate to and outside of the ear, if the strap is connected to the earpiece of the eyewear device and worn in combination with the eyewear device; a receiver electrically connected to the audio device, wherein the receiver is adapted to receive the one or more audio signals, wherein the receiver is further adapted to remotely communicate with a sound transmission device; and a power source electrically connected to the audio device and to the receiver that is adapted to supply power to the audio device and the receiver. In one embodiment the audio device is adapted to connect the strap to the earpiece of the eyewear.

20 Claims, 7 Drawing Sheets

EYEWEAR RETENTION DEVICE

CROSS-REFERENCE TO RELATED APPLICATIONS

This application claims priority to U.S. Provisional Patent Application Ser. No. 61/172,965, filed Apr. 27, 2009, which is incorporated herein in its entirety except for paragraphs three [Para 3] and seven [Para 7].

FIELD

This patent application relates to a flexible eyewear retention device with an integrated audio device.

BACKGROUND

Eyewear retention devices adapted to be connected to the earpieces of an eyewear device, such as glasses or sunglasses, and worn around a user's head or neck to keep the eyewear in place, are known. This type of eyewear retention device is made of a flexible material such as neoprene, fabric, or cord (including semi-flexible materials such as molded plastic straps) and often has an adjustable length. Some styles of eyewear retention device have loops on their ends, through which the earpieces of the eyewear device may be placed to connect the strap to the eyewear. Other styles of eyewear retention device are tubular or have flexible end sockets to receive the ends of the earpieces to connect the eyewear to the strap.

Headphone speakers are also known, the speakers adapted to be connected by a wired or wireless connection to a sound transmitting device such as a CD player, MP3 player, radio, audio compression storage device or other audio device carried remotely in a pocket or elsewhere on the person, such that the headphone speakers are "plugged in" to the sound transmission device. Two common types of headphone speaker include "over-the-ear" or "in-the-ear" styles. Over-the-ear speakers are typically worn over a user's ear, while in-the-ear speakers, such as ear buds, are worn in a user's ear. Additionally, DMA exciter headphone speakers are known, which transmit audio signals to the ear or surfaces of the ear. DMA exciter speakers are typically not worn in the ear, but rather behind or near the ear.

Wireless headsets that are used with mobile telephones are also known. Wireless mobile phone headsets typically use the Bluetooth™ short-range wireless communication protocol. The typical "headset" is actually a device worn on the user's ear to provide hands-free communication and control between the user and a nearby mobile device such as a phone. Other Bluetooth-type communication uses include, but are not limited to, wireless networking between PCs; wireless communication with PC input and output devices; transfers of files, contact details, calendar appointments, and reminders between devices using OBEX (OBject EXchange) communication protocol; replacement of traditional wired serial communications between devices; as a substitute for infrared control over devices; sending small advertisements between Bluetooth-enabled devices; in wireless video game controllers; and for converting mobile phones to modem use. While Bluetooth-type wireless headsets are primarily used in conjunction with mobile phones, it is possible to use such headsets in conjunction with these other devices.

U.S. patent application US 2009/0097688 discloses audio speakers mounted on housings arranged to be carried by the frame of a pair of eyeglasses, to allow the user to listen to a radio, CD player, MP3 or other data file player, or a mobile phone or other mobile communication device, via a receiver provided in the eyeglasses themselves. The audio speakers are intended to float immediately adjacent the user's ear canal entrances, or to be used as in-ear speakers. The housings define support regions that may be worn over and/or behind the ear, the arms/earpieces of the glasses resting upon the support regions of the housings rather than directly upon the ears. Alternatively, the support regions may be adapted to allow the associated housings to be carried by the arms or earpieces of a pair of glasses. In one embodiment, the audio speaker in one of the housings is directly electrically connected by a terminal to the receiver in the glasses frame, and the other audio speaker in the housing on the opposite side of the glasses is connected to the receiver by a signal-carrying wire passing through a strap that connects the audio housings behind the user's neck or head and that also serves as a safety strap. The application also teaches that the receiver on the glasses frame could incorporate a Bluetooth type transmitter/receiver, and that the receiver on the glasses frame could include a microphone and transmitter for that purpose.

U.S. patent application Ser. No. US 2008/0107289 discloses a bone conduction audio device that is incorporated into a headband worn around the head, hat or helmet, in various embodiments. This audio device transmits sound via bone conduction, whereby sound is transmitted directly from the skull and jaw bones to the cochlea, bypassing the outer and middle ears of a user. The disclosure teaches that because each user has a unique vibratory pattern for his/her skull, the transducers can be movable/adjustable to adjust sound for each user. In one embodiment, the headband is rotated around a user's head to adjust sound by making contact with different skull parts. In an alternate embodiment, the transducers are movable about the headband to adjust sound. The application teaches that at a minimum, transducers should be located at the front and back of a user's head. The application teaches that the bone conduction audio device is designed for underwater use—it is waterproof. The application discloses that the headband can be coupled by wired or wireless connection to a sound source such as an MP3 player, CD player, or other portable musical device that can be worn on the arm. The disclosure states that the transducers may also be connected to the band of eyewear such as goggles, a facemask or sunglasses.

U.S. Pat. No. 5,715,323 to Walker discloses a tubular strap with tubular ends engaging the ends of the earpieces on a pair of eyeglasses, a miniature radio clipped to one of the tubular earpiece-receiving ends, and an audio speaker on the exterior of each of the tubular ends, the speakers mounted on auxiliary tubes on the exterior of the tubular ends. Speaker wire connecting the two speakers runs through the tubular strap, but is not present in the earpiece-receiving tubular ends, so that the earpieces do not rub the wire when the earpieces are inserted and removed in the strap's tubular ends. The speakers appear to be of the in-ear "bud" type.

U.S. Pat. No. 6,233,345 to Urwyler discloses a tubular eyeglass strap with in-ear earphones disposed at each open end of the tubular strap, and connecting wires running through a channel in the tubular strap. Lateral slits are formed near the open ends of the strap to receive the earpiece ends of a pair of eyeglasses. The portions of the tubular strap between the lateral slits and the open ends wrap over and around the forward portions of a user's ears, and the earphones lodge in the user's ear canal.

SUMMARY

An eyewear retention device having integrated electronics to transmit sound to the ear or ear surfaces is provided. In various embodiments, the eyewear retention device may employ Bluetooth technology and/or wireless technology and be capable of transmitting one or more audio signals received from a sound transmission device, such as a cellular telephone, CD player, MP3 player, compressed audio signal player, computer, portable computer, PDA, mobile communications device or other audio transmission device.

What is provided is an eyewear retention device comprising two ends, wherein each end is adapted for removable connection to an earpiece of an eyewear device; an audio device located substantially near at least one of the ends, wherein the audio device is adapted to play one or more audio signals for transmission to one or more surfaces of a human auditory passage at a location proximate to and outside of the ear, if the strap is connected to the earpiece of the eyewear device and worn in combination with the eyewear device; a receiver connected to the audio device, wherein the receiver is adapted to receive the one or more audio signals, wherein the receiver is further adapted to remotely communicate with a sound transmission device to receive the audio signals; and a power source electrically connected to the audio device and to the receiver that is adapted to supply power to the audio device and the receiver. The audio device may transmit the audio signals by air conduction and/or by bone conduction.

In a further form, the audio device depends downwardly and at a forward angle relative to the earpiece of the eyewear if the retention device is connected to the eyewear. The audio device has a sound transmitter located on a forward-facing inner edge of the audio device, such that the sound transmitter is positioned against the back of the ear under tension if the eyewear is worn with the retention device. In a further form, the retention device includes a strap that extends from the audio device, and in a further form the audio device is located between the strap and the earpiece of the eyewear device and connects the strap to the earpiece. In still a further form, an upper end of the audio device comprises a flexible eyewear connector for directly engaging the earpiece of the eyewear. In still a further form, the strap extends from the lower end of the audio device at an initial forward angle.

BRIEF DESCRIPTION OF THE DRAWINGS

Subject matter is particularly pointed out and distinctly claimed in the concluding portion of the specification. Claimed subject matter, however, as to structure, organization and method of operation, together with objects, features, and advantages thereof, may best be understood by reference to the following detailed description if read with the accompanying drawings in which:

DETAILED DESCRIPTION

In the following detailed description, numerous specific details are set forth in order to provide a thorough understanding of the invention as defined in the claimed subject matter, and as an example of how to make and use the invention. However, it will be understood by those skilled in the art that claimed subject matter is not intended to be limited to such specific details, and may even be practiced without requiring such specific details. In other instances, well-known methods, procedures, and components have not been described in detail so as not to obscure the invention defined by the claimed subject matter.

Flowcharts, also referred to as flow diagrams by some, are used in some figures herein to illustrate certain aspects of some embodiments. Logic they illustrate is not intended to be exhaustive of any, all, or even most possibilities. Their purpose is to help facilitate an understanding of this disclosure with regard to the particular matters disclosed herein. To this end, many well-known techniques and design choices are not repeated herein so as not to obscure the teachings of this disclosure.

Figure 1:
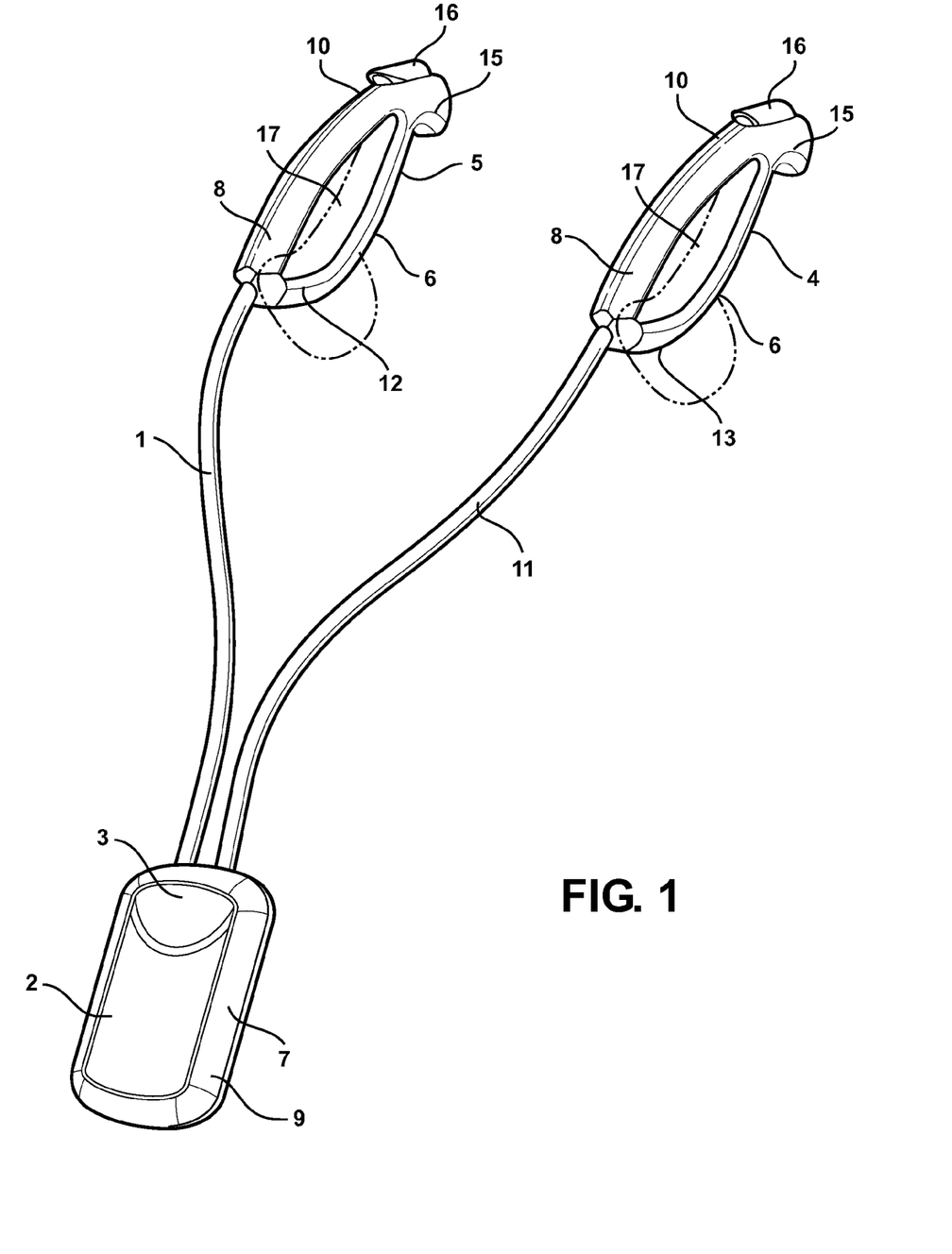
FIG. 1 is an example first embodiment of an eyewear retention device in a perspective rear view.
Figure 2:
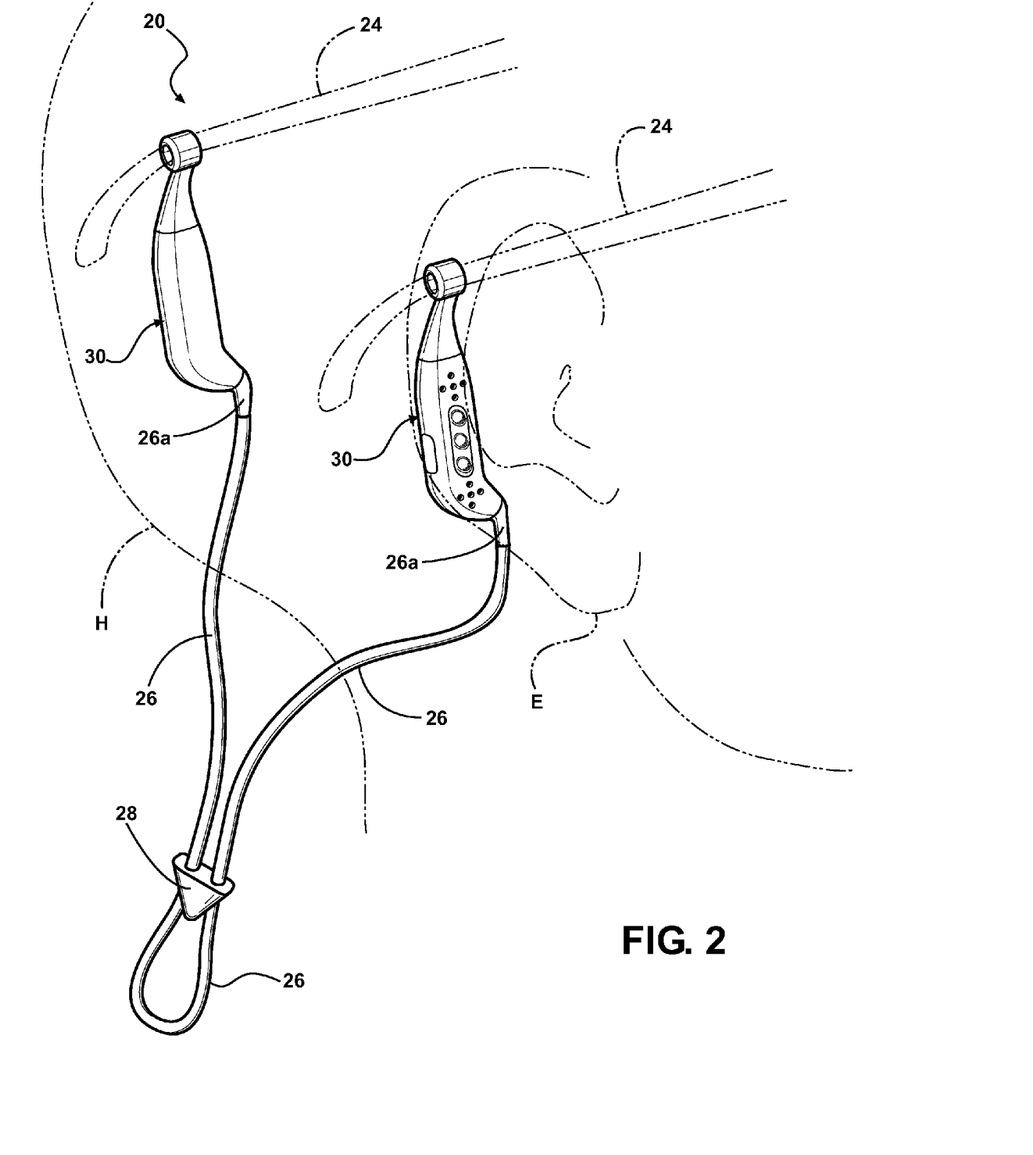
FIG. 2 is an example alternate embodiment of an eyewear retention device in a perspective rear view.

Referring to FIG. 1, an eyewear retention device is provided. The eyewear retention device is used to retain eyewear, such as (without limitation) glasses, sunglasses, safety glasses or shooting glasses, on a user's head or around a user's neck. A user can removably connect earpieces of an eyewear device such as glasses to the eyewear retention device (for example via the illustrated earpiece holders 16 and 17) and wear the retention device such that the device is placed around the user's head or neck to help keep the eyewear in place while being worn by the user. The retention device comprises a strap 1, preferably made of a flexible material such as but not limited to neoprene, fabric or cord. In some embodiments, strap 1 can be solid, or flat, or tubular with a hollow center capable of holding one or more wires 11 therein to connect the electronics of the device. In other embodiments, strap 1 can have a hollow center or hollow ends or sockets with a diameter capable of inserting the ends of earpieces of an eyewear device therein.

Strap 1 can be of fixed or adjustable length. Sliding bolo 3 is an example of a device that can be used to adjust the length of strap 1. However, claimed subject matter is not so limited and various other mechanisms, including but not limited to clips, buckles, cinches, toggles, slides and the like may be employed to adjust the length of strap 1, hereafter generally referred to as "cinch" or "adjuster".

The eyewear retention device includes a receiver 2, in FIG. 1 adjacent or integrated with bolo-type cinch 3 in the approximate middle of strap 1, that is capable of receiving one or more audio signals from a remote sound transmission device. In various embodiments, receiver 2 may remotely communicate with a sound transmission device via technology such as wireless or Bluetooth technology. In various embodiments, receiver 2 may receive signals from a variety of sound transmission devices, including but not limited to cellular telephones, MP3 players, other compressed audio players, CD players, radios, computers, mobile PCs, portables PCs, PDA, mobile communications device, or other sound transmission devices.

In some embodiments, receiver 2 may comprise a transceiver, capable of sending one or more audio signals to a remote sound transmission device, such as a cellular telephone. For example, receiver 2 illustrated in FIG. 1 represents a Bluetooth receiver SoC. Further, some embodiments may contain or be connected to a microphone that is electrically connected to the transceiver and capable of generating audio signals for transmission.

In different embodiments, receiver 2 may be placed at a location substantially near one of the ends of strap 1, at a location substantially in the middle of strap 1 (as shown in FIG. 1), or at any location along strap 1. Claimed subject matter is not intended to be limited to requiring a particular location for receiver 2 on the retention device.

In some embodiments, receiver 2 may be placed in its own housing such as 7. Housing 7 may be made of a flexible material, such as rubber. However, claimed subject matter is not so limited and housing 7 may be made of many other flexible or rigid materials. In some embodiments, housing 7 may also contain cinch 3 as illustrated in FIG. 1.

The eyewear retention device also includes at least one and preferably a pair of audio devices 4 and 5 associated with earpiece connectors 16, 17 at a location substantially at or near one or both ends of strap 1, and thus substantially at or near the ends of the retention device. Some embodiments may only contain one audio device 4 or 5. Audio devices 4 and 5 are capable of playing one or more audio signals for transmission to one or more surfaces of a human auditory passage at a location proximate to and outside of the ear, if the strap 1 is connected to an earpiece of the eyewear device and worn in combination with the eyewear device. In the illustrated embodiment of FIG. 1, audio devices 4 and 5 comprise DMA sound exciters, although other types of air conduction or bone conduction audio devices for delivering sound to the human ear can be used. Audio devices 4 and 5 are located at or substantially at or near the ends of strap 1, allowing them to be worn at a location proximate to and outside of the ear (and preferably and specifically behind the ear) for transmitting audio signals to the ear if the retention device is in use retaining eyewear on the user's head, and further functioning as a supportive and retentive link between the eyewear and the strap 1. In various embodiments, audio devices 4 and 5 may transmit audio signals without impeding a user from hearing other sounds.

Audio devices 4 and 5 are contained in housings 6. Housings 6 may be made of a flexible, comfortable material, such as rubber, but claimed subject matter is not so limited. It might also be possible to form audio devices 4 and 5 into desired shapes without the need for housings 6, or the housings 6 could be partial coverings to make the audio devices 4 and 5 more comfortable and conforming to the ear.

The eyewear retention device further includes one or more power sources 9 and 10 electrically connected to the audio devices 4 and 5 and to the receiver 2. Some embodiments may only include one power source 9 or 10. Power sources 9 and 10 are adapted to supply power to the audio devices 4 and 5 and the receiver 2. Power sources 9 and 10 may be located at or near one or more ends of strap 1 (and thus at or near one or more ends of the retention device) (as shown by power source 10), in the middle of strap 1 (as shown by power source 9), or at any point along strap 1. Power sources 9 and 10 may employ battery packs, batteries, rechargeable batteries, solar cells or other sources capable of powering the electronics of eyewear retention device. In some embodiments, wiring 11 contained within strap 1, for example running through a channel in a tubular strap 1, may electrically connect power sources 9 and 10 to audio devices 4 and 5 and receiver 2. For example, wiring 11 may be conductive connective wiring. Wiring 11 may employ standard multiple electrical connecting processes.

In some embodiments, power source 9 may be contained within housing 7, as shown in FIG. 1. Likewise, in some embodiments, power source 10 may be contained within housing 8. Housings 7 and/or 8 may be attached form housings or may be stitched or adhered to strap 1. However, claimed subject matter is not so limited.

FIG. 1 also shows amplifiers 12 and 13, which may be included in various embodiments. Amplifiers 12 and 13 amplify audio signals received by receiver 2 for transmission to a human auditory passage by audio devices 4 and 5. Claimed subject matter is not intended to be so limited.

In some embodiments, eyewear retention device may further comprise ear hooks 15. Ear hooks 15 may assist in retaining the eyewear on a user's head or may be ornamental in nature.

Various embodiments may include one or more straight glasses earpiece holders 16. Straight glasses earpiece holder 16 may assist with removably connecting an eyewear earpiece having a straight shape to strap 1. Various embodiments may include one or more curved glasses earpiece holder 17. Curved glasses earpiece holder 17 may assist with removably connecting an eyewear earpiece having a curved shape to strap 1. However, other embodiments may contain an earpiece holder capable of connecting both straight and curved shape earpieces to strap 1, and other embodiments may not contain any holders 16 or 17. For example, in some embodiments, strap 1 may be capable of retaining the earpieces of eyewear without any holders. Claimed subject matter is not intended to be limited to this particular detail of some embodiments. Holders such as 16 or 17 may be integrated with the audio devices 4 and 5 as shown in the illustrated example of FIG. 1.

One method by which the eyewear retention device may be used is by connecting strap 1 to the earpieces of an eyewear device, as shown in the illustrated example by connecting audio devices 4 and 5 to the earpieces of the eyewear device, and placing the eyewear device on his/her face such that strap 1 is positioned around the back of the user's head or neck and audio devices are located substantially behind the user's ears. The user may synchronize the eyewear retention device with a sound transmission device. Receiver 2 receives one or more audio signals from the sound transmission device. The audio signals are transmitted to the audio devices 4 and 5 via wiring 11. Audio devices 4 and 5 transmit the audio signals to one or more auditory passages of the user's ear. Unlike over-the-ear or in-the-ear headphone speakers, various embodiments allow a user to hear other sounds in addition to audio signals from audio devices 4 and 5, due to the location from which audio devices 4 and 5 transmit sounds to one or more auditory passages of the user's ear—from a location proximate to, outside of and behind the ear.

Another embodiment of the claimed subject matter is illustrated in FIGS. 2 through 6. An eyewear retention device 20 is adapted to be connected to earpieces 24 of eyewear such as (but not limited to) sunglasses 22. Eyewear retention device 20 includes a flexible strap 26 whose ends 26a are connected to or integrated with over-the-ear audio devices 30. An adjuster 28 is optionally located on strap 26 to adjust the length of strap 26 relative to a user's head. Strap 26 may be continuous or may comprise joined sections of strap material.

The illustrated example of eyewear retention device 20 uses two audio devices 30, one for each ear. In the illustrated example an audio signal receiver of the type described above in connection with FIG. 1 (including transceivers) is incorporated into at least one of the audio devices. The receiver is located internally in an audio device 30, and thus is not visible in FIG. 2. While a receiver may be incorporated into more than one of the audio devices 30, a receiver in one of the audio devices as in the illustrated example of FIGS. 2 through 6, or located elsewhere on device 20 and connected to at least one of the audio devices 30, will be useful.

Figure 3:
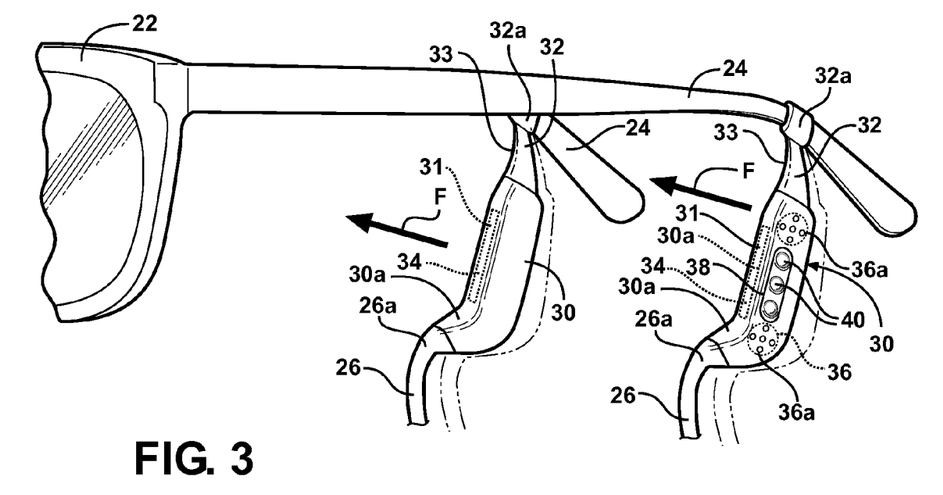
FIG. 3 is left side front perspective view of the eyewear retention device of FIG. 2.
Figure 3A:
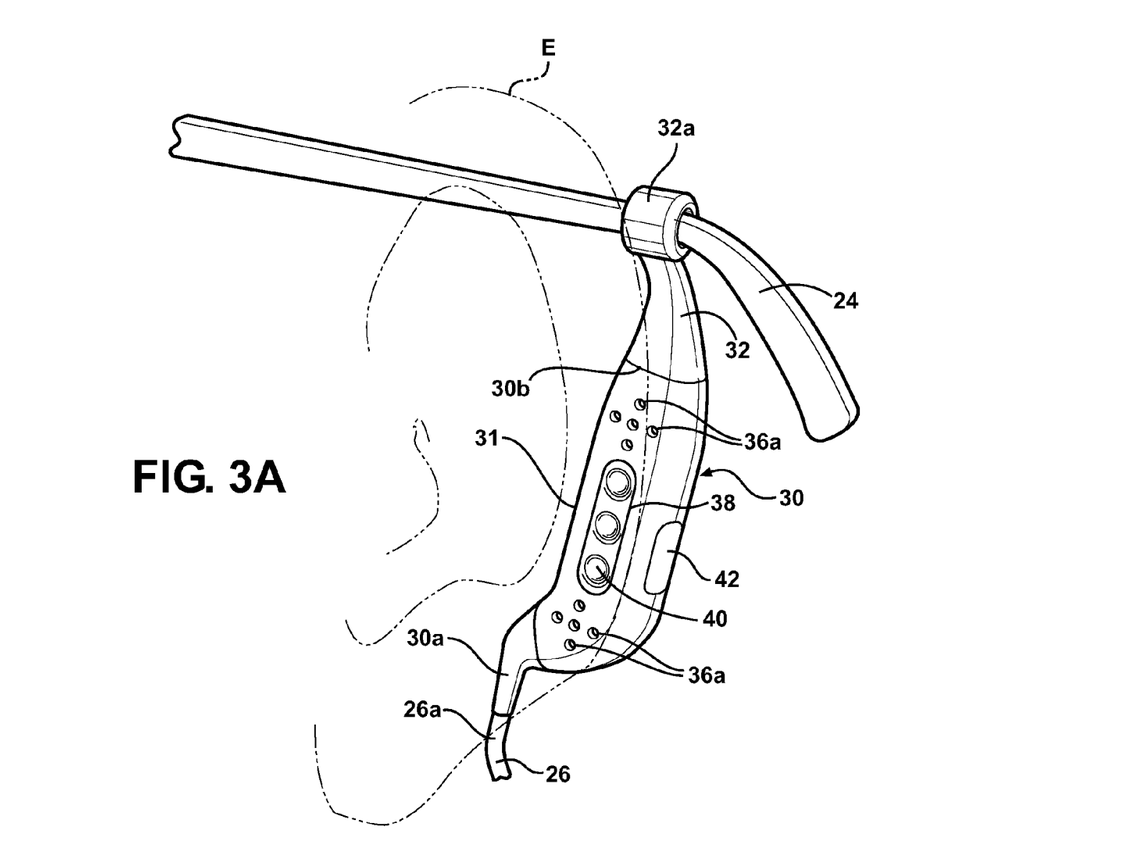
FIG. 3A is similar to FIG. 3, but with the operative fit of an audio device on the retention device shown in relation to a wearer's ear.

Referring to FIGS. 3 and 3A, the audio devices 30 depend downwardly and at a forward angle from the earpieces 24 of the eyewear 22 if the retention device 20 is connected to the eyewear. The lower ends 30a of audio devices 30 curve or angle forwardly toward the user's ear E, in the direction of arrow F, such that ends 26a of strap 26 may extend from respective lower ends 30a of the audio devices 30 at an initial forward angle as shown in the illustrated example, pointing toward the user's ear, before the remainder of strap 26 drops to curve or drape or angle back (depending upon the degree of flexibility of the strap material) around behind the user's head.

Audio device 30 is shown connected to earpiece 24 with a connector 32, in the illustrated example a semi-rigid rubber or rubber-like or relatively soft polymer member with a tubular socket or grommet 32a at an upper end, sized and shaped to securely receive the end of earpiece 24 inserted therein. Other types of connection may be used, and claimed subject matter is not limited to the illustrated connector example. Connector 32 connects audio device 30 to earpiece 24 at an angle, or itself is angled relative to its connection to the earpiece, placing audio device 30 with its lower end 30a in a forward-angled position. Illustrated connectors 32 show a forward angle or curvature on their forward or inner faces or edges 33, and tubular eyepiece-receiving portions 32a have an orientation, giving the connected audio device a forward bias in the direction of arrow F. Connector 32 may be an integral part of audio device 30, for example molded or otherwise permanently integrated with the audio device 30, although it may also be a separable connector piece, provided it is capable of positioning the audio device 30 behind the ear, as described, if connected to earpiece 24. Alternately, connector 32 may be an integral part of the strap 26, provided it is capable of positioning the audio device 30 behind the ear, as described, if connected to earpiece 24. In the illustrated example, connector 32 is removable from the housing of audio device 30, for example with a detachable mechanical or magnetic connection, in order to allow for replacement of the connector. However, claimed subject matter is not so limited.

Each audio device 30 has a sound transmitter 34 located on a forward-facing inner face or edge 31 of the audio device, such that the sound transmitter 34 is positioned behind the ear E and may be positioned against the back of the ear E and may be under tension if the eyewear is worn with the retention device attached. Sound transmitter 34 may be exposed, or may be covered by a membrane or portion of the housing of audio device 30 as illustrated. Connector 32 may be rigid enough to bias and keep audio device 30 at the forward angle as shown in the illustrated example if retention device 20 is attached to eyewear 22 (and also enough to keep audio device 30 pressed or held against the back of the ear if worn), but also may be flexible enough to yield or "give", for comfort and fit, in order to accommodate variations in the ears of users and variations in the angle of earpieces 24 at the location the audio devices 30 are connected to the earpieces. Such forward bias is shown by solid lines and such flexibility or "give" is shown schematically by phantom lines in FIG. 3A.

Sound transmitter 34 in the illustrated example is a DMX exciter type audio transmitter, although sound transmitter 34 may be any type of audio transmitter or transceiver. If a transceiver type, associated audio device 30 is provided with one or more microphones 36 located on the audio device 30 to receive voice signals from the user, for example through openings 36a or other sound-transmissive regions or surfaces on the audio, and to convert and/or transmit the voice signals to transmitter 34 for communication to a remote device, for example the transmitter using a Bluetooth wireless link or other wireless communication methods and devices to connect to an MP3 player or mobile phone for music and/or phone calls. Transmitter 34 may be capable of communicating with more than one type of remote device, or of using more than one type of wireless communication method.

At least one of audio devices 30 may be provided with controls 38 operable by the user, for example such as the illustrated push-button panel with three membrane-covered control buttons 40 located to be operated by a user's fingers. Control options can vary, and may include control over audio device and/or receiver and/or remote device functions such as power on/off, volume up/down, track or playlist changes, switching transmit or receive or other communication modes, and others not limited by this disclosure or the claimed subject matter. Controls 38 may also be voice-activated. Controls 38 may be incorporated into an audio device 30, or may be located elsewhere on retention device 20.

Audio device 30 may also be provided with a hardwired communication port 42 for plug-and-play communication between the transmitter 34 and/or a remote device such as an MP3 player or mobile phone. In the illustrated example of FIGS. 2 through 6, communication port 42 is a USB port, although other types of plug-in communication or data transfer ports may be used. Port 42 may also be a power recharging port for providing power to electronics in retention device 20 and/or for recharging a battery in retention device 20.

In some embodiments, either or both of audio devices 30 may be provided with any user control such as 38 and/or any microphone such as 36 and/or any plug-in port such as 42. Control 38, microphone 36 and port 42 may be provided on the same audio device 30, or on different audio devices 30 in different combinations if more than one audio device 30 is provided on retention device 20. For example, the illustrated example shows two audio devices 30 and one control 38. Alternately, an embodiment could have two audio devices 30, each having a control 38. Similarly, the illustrated example shows two audio devices 30 and one microphone 36. Alternately, an embodiment could have two audio devices 30, each having a microphone 36. Various other combinations are possible in different embodiments.

Control 38 may control any communication or sound capabilities of the retention device, such as but not limited to audio volume, call answering, audio file selection, or any other function of the audio or communications devices incorporated in the retention device 20.

In some embodiments, port 42 may be used to connect the retention device to external devices such as but not limited to a computer, charger, audio device or other device. Port 42 may be used to upload audio or other stored files to the retention device, or download audio or other files off of the retention device.

Figure 4:
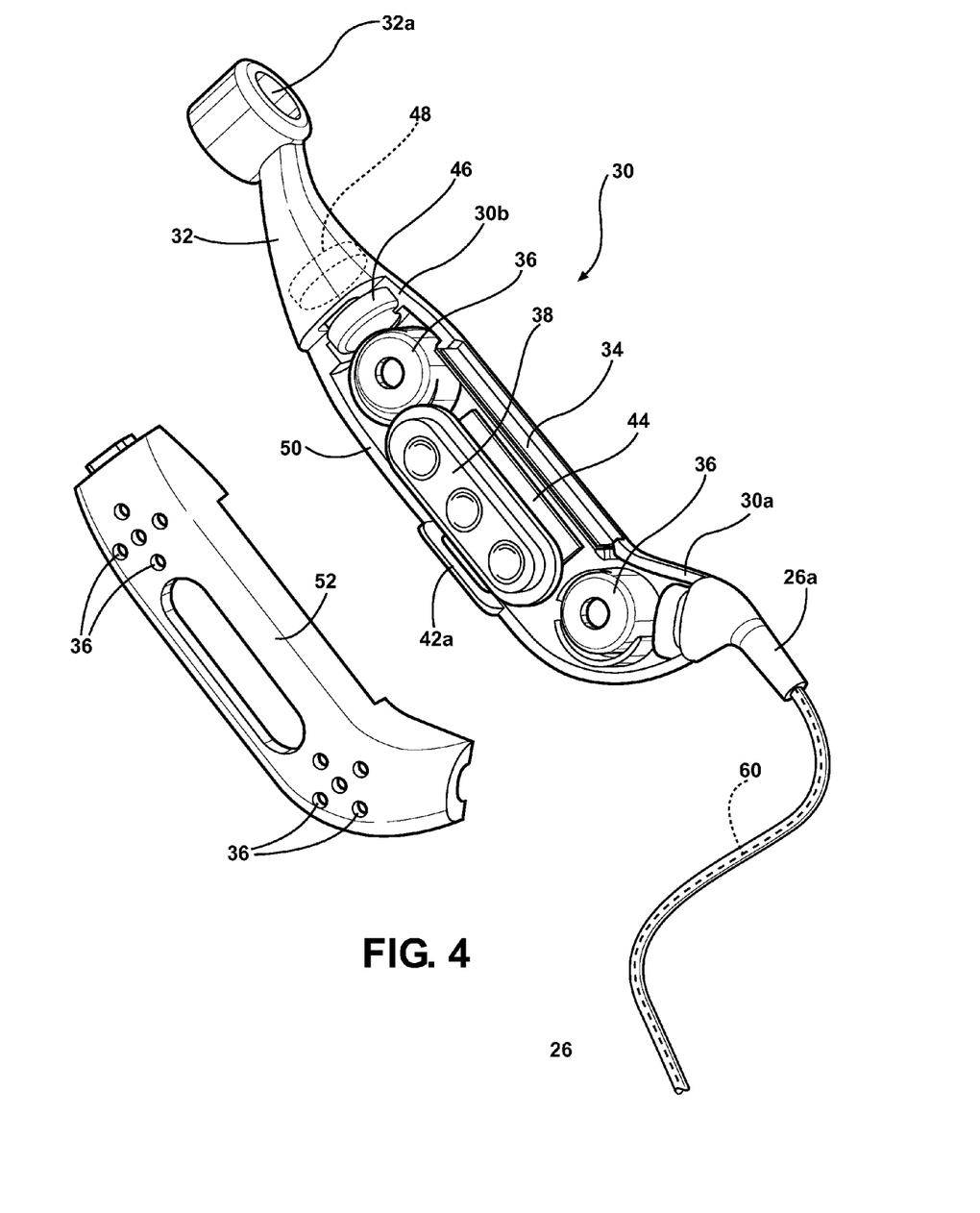
FIG. 4 shows one of the audio devices of FIG. 2 with a portion of the cover/housing removed.
Figure 5:
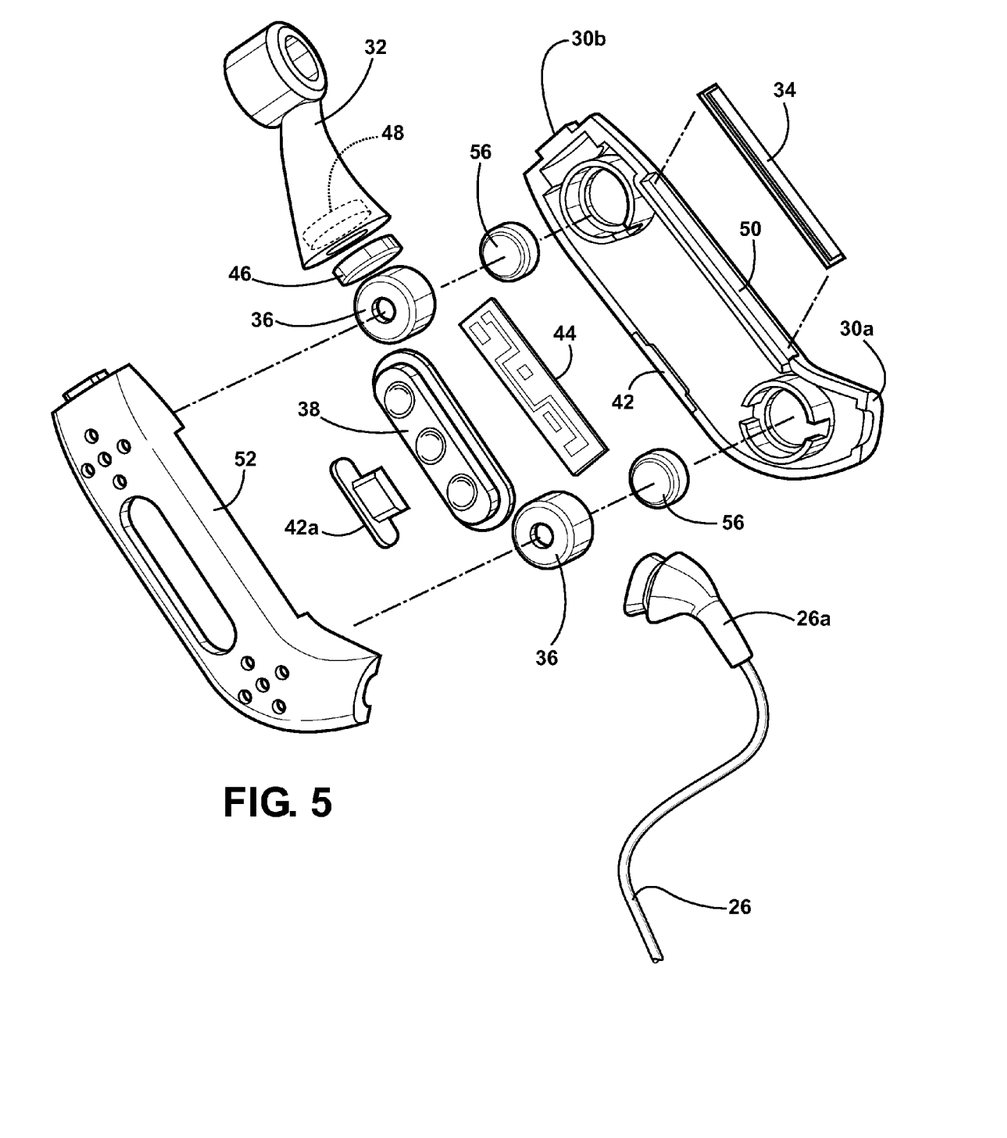
FIG. 5 is similar to FIG. 4, but with portions of the audio device exploded from the housing.

FIGS. 4 and 5 illustrate an audio device 30 with a cover removed (FIG. 4) and with various internal components exploded out (FIG. 5). Audio device may be sealed and not have a removable cover, but the illustrated device has a removable cover 52 as part of the audio device housing 50, which may be molded from a polymer material, or may be constructed by other methods and/or made of other materials. Illustrated components in audio device 30 include the previously mentioned microphones 36, pushbutton control panel or membrane 38 with individual buttons 40, a DMX exciter type sound transmitter 34, and a plug 42a for USB port 42. Also visible are a Bluetooth type chip or chipset type receiver 44, and mating magnet clasps 46 and 48 in or adjacent the upper end 30b of the audio device for removably attaching connector 32 to the upper end of the audio device 30. The communication and audio signal transmitting and receiving components may be operatively connected as needed by those skilled in the art to enable the receiver 44 to supply audio signals to sound transmitter 34 from a remote device such as an MP3 player or mobile phone or other device, and to receive audio signals and control signals from microphones 36 and control panel 38, respectively, and to transmit them to a remote device such as an MP3 player or mobile phone or other device. Other power, signal and/or communication connections and wiring have also been omitted for clarity, as those skilled in the art will be familiar with different ways of making such connections depending on the internal components provided in audio device 30. Wiring 60 for audio signals and/or power between audio devices 30 on opposite ends of strap 26 may exit the lower end 30a of the audio device and run through the interior of strap 26 (as illustrated, with strap 26 being tubular or hollow), or along the exterior of the strap. One or more batteries such as 56 may be provided in audio device 30, or may be provided in another audio device and connected electrically through wiring 60, or may be provided elsewhere on retention device 20 and connected by wiring to one or more of the internal components in audio device 30 to supply needed power.

Upper and/or lower ends 30a and 30b of audio device 30 may be integral and non-removable parts of audio device 30, for example integrally molded portions of housing 50 as illustrated. Upper end 26a of strap 26 may be an integral part of the strap material adhered or knotted or clipped into lower end 30a of the audio device 30, or may be a molded polymer or rubber piece integrated with or otherwise appended to the cord or fabric material of strap 26 as an extension of strap 26 as shown in the drawings, and especially in FIG. 5, designed to removably mate with the lower end 30a of the audio device.

Figure 6:
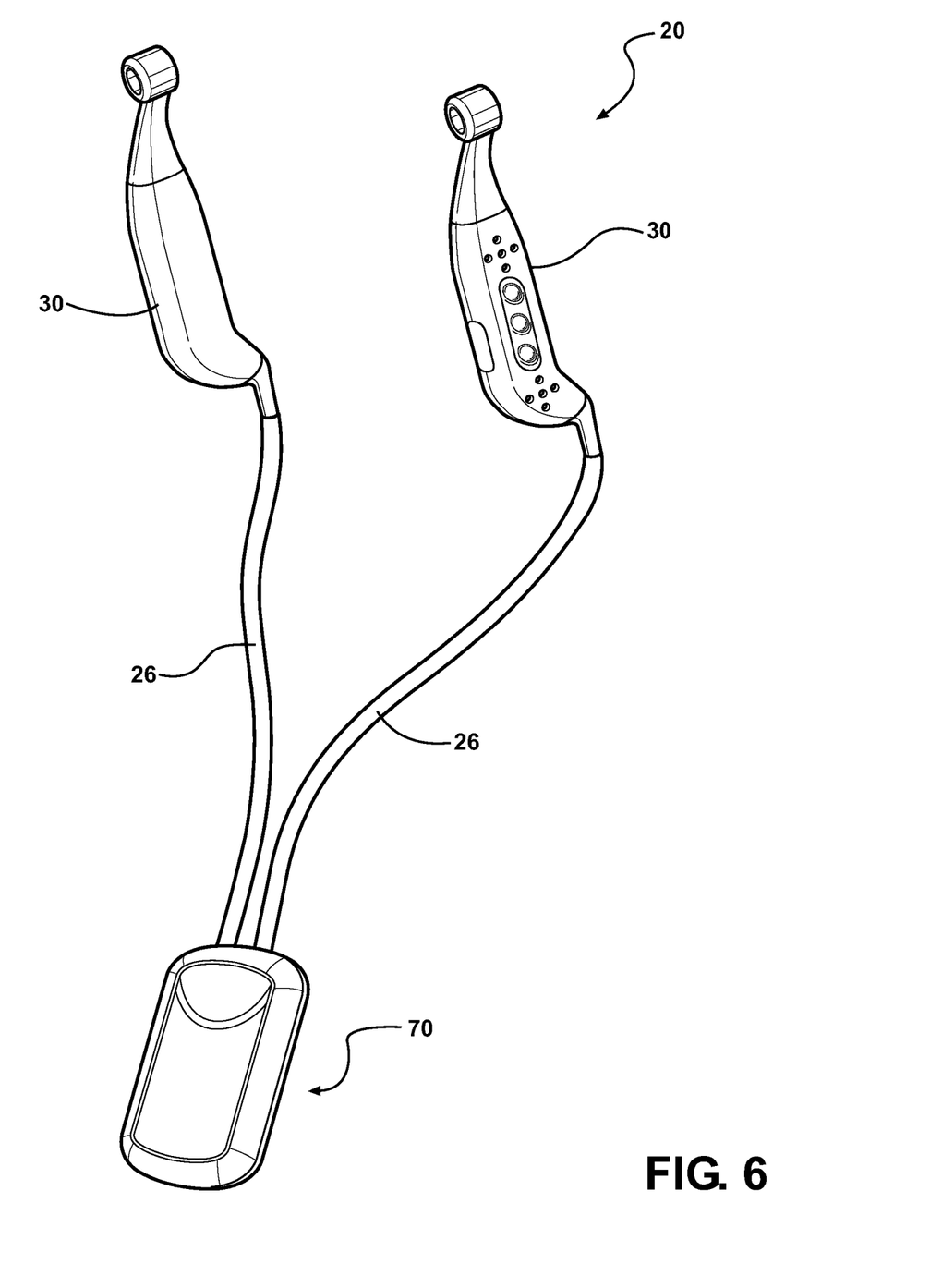
FIG. 6 illustrates the retention strap of FIG. 2 modified with a sound transmission device as mounted to the retention device of FIG. 1; and, FIG. 7 is an example of a method of assembling an eyewear retention device.

FIG. 6 illustrates an eyewear retention device 22 with portions of the components previously illustrated in audio device(s) 30 contained in a bolo type cinch housing 70, similar to that shown in FIG. 1, on an intermediate portion of strap 26. For example, cinch 70 could contain the Bluetooth or other wireless receiver 44 and/or batteries 56 and/or controls 38, by way of non-limiting example. Cinch housing 70 may also be non-adjustably mounted on strap 26, such that strap 26 is a fixed length.

Figure 7:
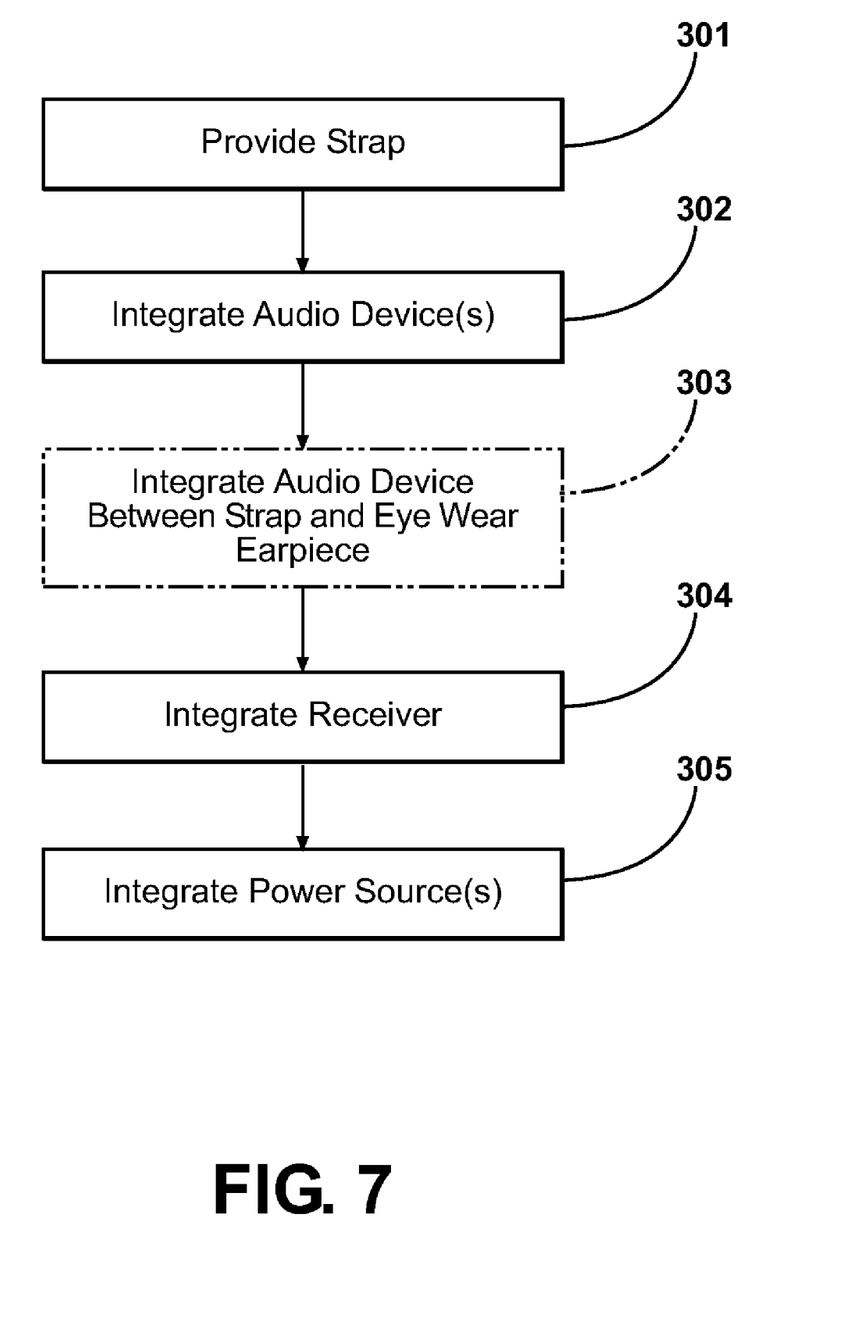

As shown in FIG. 7, the present disclosure also includes a method of assembling an eyewear retention device. Box 301 depicts providing a strap. In various embodiments, the strap comprises a flexible strap having a body and two ends. The strap may have a cinch or other adjuster capable of adjusting the length of the strap.

Box 302 depicts integrating one or more audio devices into the strap. For example, a first audio device is integrated into the strap substantially near one end and a second audio device is integrated into the strap substantially near the other end. The audio devices are capable of playing one or more audio signals and transmitting the one or more audio signals to one or more surfaces of a human ear from a location proximate to, outside of and behind the ear if the strap is connected to an earpiece of the eyewear device and worn in combination with the eyewear device. The audio devices may comprise DMA sound exciters.

Box 303 depicts an additional and optional step of integrating the audio device between a strap member of the eyewear retention device, such as 26 illustrated above, and an earpiece of eyewear, such as earpiece 24 illustrated above. Audio devices 30 may, as in the illustrated example above, interconnect the flexible strap member to the earpiece of the eyewear as an intermediate supportive link between strap and earpiece, functioning supportively and retentively in-line with the strap member to help retain the eyewear on the user's head while maintaining an angle relative to the user's ear(s) useful for transmitting sound to the outside back surface of the user's ear(s).

Box 304 depicts integrating a receiver to the strap. The receiver is electrically connected to the audio devices. It is capable of receiving one or more audio signals, and is further capable of remotely communicating with a sound transmission device, such as a cellular telephone, MP3 or other compressed audio signal player, CD player computer, portable computer, PDA mobile communications device or other audio transmission device. The receiver may remotely communicate with the audio transmission device via wireless or Bluetooth technology.

Box 305 depicts integrating a power source to the strap. The power source may comprise a battery pack. It is electrically connected to the audio devices and the receiver, and is adapted to supply power to the audio devices and the receiver.

Applicant specifically disclaims paragraph three of the provisional application from which this application claims priority, U.S. Provisional Patent Application Ser. No. 61/172,965, which states that all elements of this invention are necessary for it to operate. The list of elements preceding paragraph three are merely possible features and details associated with a particular embodiment. Claimed subject matter is not so limited.

Applicant specifically disclaims paragraph seven of the provisional application from which this application claims priority, U.S. Provisional Patent Application Ser. No. 61/172,965, which states that this is the only way for components to be configured for the device to perform its desired function. Rather, different operational configurations, which may be apparent in different embodiments, are possible within the spirit and scope of claimed subject matter.

In the preceding description, various aspects and examples of making and using claimed subject matter have been described. For purposes of explanation, systems and configurations were set forth to provide a thorough understanding of claimed subject matter. However, these are merely example illustrations of the above concepts wherein other illustrations may apply as well, and the scope of claimed subject matter is not limited in these respects. It should be apparent to one skilled in the art having the benefit of this disclosure that claimed subject matter may be practiced without being limited to the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. An apparatus, comprising:
an eyewear retention device comprising two ends and a strap, wherein each end is adapted for removable connection to an earpiece of an eyewear device;
the eyewear retention device further comprising an audio device located substantially at at least one of the ends, wherein the audio device is adapted to play one or more audio signals for transmission to one or more surfaces of a human auditory passage of an ear from a location proximate to, outside of and behind the ear and is adapted to be in contact with one or more surfaces behind the ear, if the eyewear retention device is connected to the earpiece of the eyewear device and worn in combination with the eyewear device;
the eyewear retention device further comprising a receiver electrically connected to the audio device, wherein the receiver is adapted to receive the one or more audio signals, wherein the receiver is further adapted to remotely communicate with a sound transmission device; and the eyewear retention device further comprising a power source electrically connected to the audio device and to the receiver that is adapted to supply power to the audio device and the receiver.

2. The apparatus of claim 1 wherein the at least one of the ends comprises the audio device.

3. The apparatus of claim 1 wherein the audio device is adapted for removable connection to the earpiece between the strap and the earpiece to secure the strap to the earpiece of the eyewear device.

4. The apparatus of claim 1 wherein the receiver further comprises a transceiver adapted to send one or more audio signals.

5. The apparatus of claim 4 further comprising a microphone electrically connected to the transceiver and wherein the microphone is adapted to generate one or more audio signals that the transceiver is adapted to send to the sound transmission device.

6. The apparatus of claim 1 wherein the audio device comprises a DMA sound exciter.

7. The apparatus of claim 1 wherein the sound transmission device comprises at least one device selected from the group consisting essentially of cellular telephone, MP3 player, CD player, radio, computer, portable personal computer, compressed audio file player, PDA and mobile communications device.

8. The apparatus of claim 1 wherein the audio device, receiver and power source are electrically connected with at least one wire located inside of the strap.

9. The apparatus of claim 1 further comprising a cinch adapted to adjust a length of the strap, wherein the receiver is located in the cinch.

10. The apparatus of claim 1 further comprising a flexible housing, wherein the flexible housing is coupled to the strap and wherein the housing at least partially contains at least one of the audio device, receiver and power source.

11. The apparatus of claim 1, wherein the audio device is adapted to depend downwardly and at a forward angle from the earpiece of the eyewear device if the retention device is connected to the eyewear device.

12. A method of assembling an eyewear retention device, comprising:

providing a flexible strap comprising first and second ends;

integrating a first audio device into the strap substantially at the first end and integrating a second audio device to the strap substantially at the second end, wherein the first and second audio devices are capable of playing one or more audio signals for transmission to one or more surfaces of a human auditory passage of an ear from a location proximate to, outside of and behind the ear and are adapted to be in contact with one or more surfaces behind the ear, if the eyewear retention device is connected to the earpiece of the eyewear device and worn in combination with the eyewear device;

integrating a receiver to the eyewear retention device wherein the receiver is electrically connected to the first and second audio devices, wherein the receiver is capable of receiving the one or more audio signals, wherein the receiver is further capable of remotely communicating with a sound transmission device; and integrating a power source to the eyewear retention device, wherein the power source is electrically connected to the first and second audio devices and the receiver, wherein the power source is adapted to supply power to the first and second audio devices and the receiver.

13. The method of claim 12 wherein the receiver further comprises a transceiver capable of sending one or more audio signals.

14. The method of claim 13, further comprising attaching a microphone to the eyewear retention device substantially near one of the ends, wherein the microphone is electrically connected to the transceiver and wherein the microphone is capable of generating one or more audio signals that the transceiver is capable of sending to the sound transmission device.

15. The method of claim 12 wherein the first and second audio devices comprise DMA sound exciters.

16. The method of claim 12, wherein the audio device is adapted to depend downwardly and at a forward angle from the earpiece if the retention device is connected to the eyewear device.

17. An apparatus, comprising:

means for retaining an eyewear device, the means for retaining comprising two ends, wherein at least one end is capable of being connected to an earpiece of an eyewear device;

wherein the means for retaining further comprises means for playing one or more audio signals located at a location substantially near the at least one end, wherein the means for playing is capable of playing one or more audio signals for transmission to one or more surfaces of a human auditory passage of an ear from a location proximate to, outside of and behind the ear and is adapted to be in contact with one or more surfaces behind the ear, if the means for retaining is connected to the earpiece of the eyewear device and worn in combination with the eyewear device;

wherein the means for retaining further comprises means for receiving the one or more audio signals that is electrically connected to the means for playing, wherein the means for receiving is capable of receiving the one or more audio signals, wherein the means for receiving is further capable of remotely communicating with a sound transmission device; and wherein the means for retaining further comprises means for powering, wherein the means for powering is electrically connected to the means for playing and the means for receiving, wherein the means for powering is capable of supplying power to the means for playing and the means for receiving.

18. The apparatus of claim 17 wherein the means for receiving further comprises means for transmitting, wherein the means for transmitting is capable of transmitting one or more audio signals to the sound transmission device.

19. The apparatus of claim 18 further comprising means for generating one or more audio signals, wherein the means for generating is attached to the strap substantially near at least one of the ends, wherein the means for generating is electrically connected to the means for transmitting.

20. The apparatus of claim 18, wherein the means for playing one or more audio signals is adapted to depend downwardly and at a forward angle from the earpiece of the eyewear device if the retention device is connected to the eyewear device.

* * * * *